H. L. CLEMONS.
AUTOMATICALLY LOCKING BRAKE LEVER.
APPLICATION FILED FEB. 17, 1922.
1,435,804.
Patented Nov. 14, 1922.
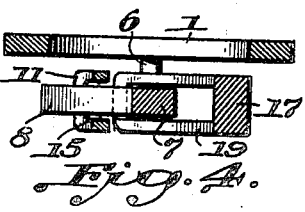
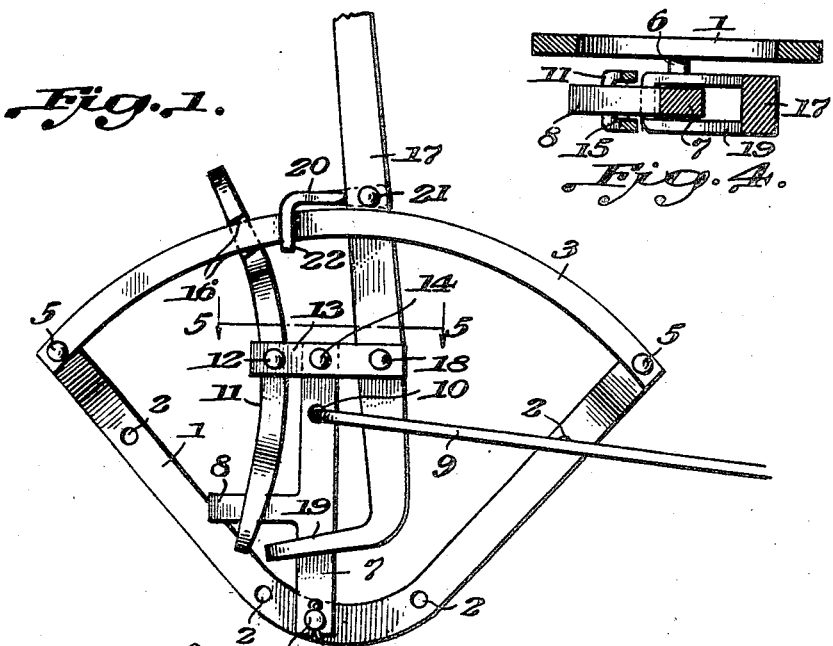
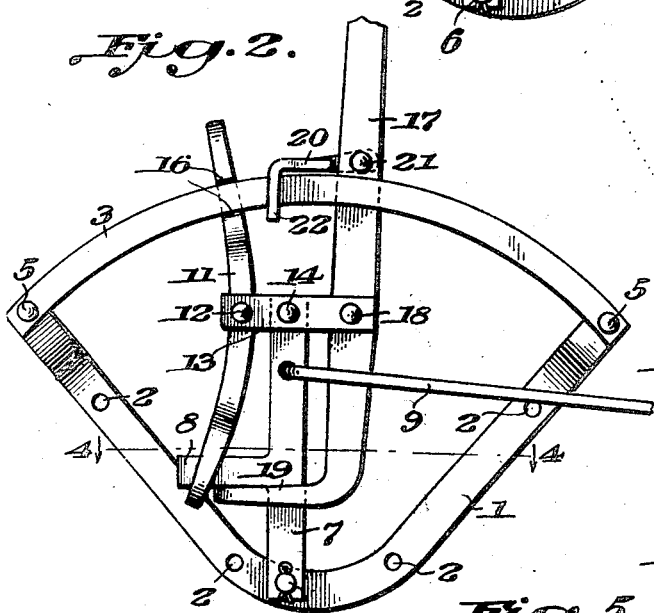
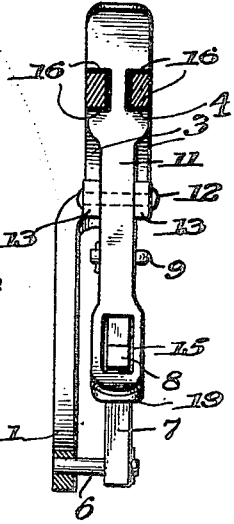
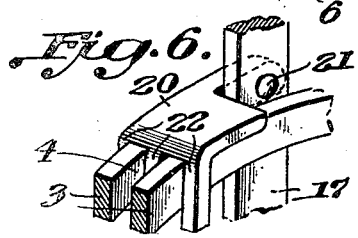
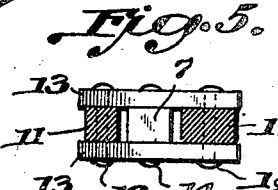

Patented Nov. 14, 1922.

1,435,804

UNITED STATES PATENT OFFICE.

HENRY LINZY CLEMONS, OF COPPER HILL, VIRGINIA.

AUTOMATICALLY-LOCKING BRAKE LEVER.

Application filed February 17, 1922. Serial No. 537,244.

*To all whom it may concern:*

Be it known that I, HENRY LINZY CLEMONS, a citizen of the United States, residing at Copper Hill, in the county of Floyd and State of Virginia, have invented certain new and useful Improvements in Automatically-Locking Brake Levers, of which the following is a specification.

This invention relates to an automatically locking brake lever adapted for use on wagons, trucks and automobiles.

The object of my invention is to entirely dispense with a toothed segment and locking pawl and to provide novel means for locking the brake of the vehicle when the lever is released after being moved to the desired position to properly apply the brake, thus saving time and effort which has to be expended on brake levers employing a pawl to engage a rack.

The invention comprises a frame having a plain segment, a rocker arm pivoted to the frame, a clutching dog pivoted to the supporting rocker arm and adapted to engage the plain segment, a hand operated lever pivotally carried by the supporting rocker arm, and devices carried by the lever adapted to be made to engage the clutching dog on opposite sides of the pivot thereof, according to the direction in which the lever is moved, for the purpose of releasing the grip of said dog on the segment.

The invention also embodies certain other features appearing more fully hereinafter.

In the accompanying drawings:

Figure 1 is a side elevation, the brake being set and the clutching dog engaged with the segment.

Fig. 2 is a similar view showing how the hand lever is moved to engage the lower end of the clutching dog to release its bite on the segment.

Fig. 3 is a vertical section through the frame, taken at the left of the clutching dog, showing the latter and front parts in full lines.

Fig. 4 is a horizontal section on the line 4—4, Fig. 1.

Fig. 5 is a similar view on the line 5—5, Fig. 1; and

Fig. 6 is a detail perspective of the upper releasing device and adjacent parts.

The frame 1 has suitable holes 2 for the insertion of bolts to secure it to the side of the vehicle and is provided with a plain segment 3 having parts separated by a space or slot 4. As shown, the segment comprises parallel parts secured by bolts 5 to the offset ends of the upper part of the frame but I do not limit the invention to this precise construction as a one-piece, slotted, segment could be used.

Pivoted to the lower part of the frame in any suitable manner, as for instance on a stud 6, is an upright supporting rocker arm 7 which carries all of the parts of the device. This rocker arm may be provided with a lateral extension 8 to serve as a guide for the lower end of the clutching dog although this guide is not essential.

The brake rod 9 is connected at 10 to the supporting rocker arm so that the application of the brake or its release is dependent upon the movement of the rocker arm.

Pivoted to the supporting rocker arm 7 is a clutching dog 11. This clutching dog may be carried in the manner shown, or otherwise; as shown, it is pivoted on a bolt 12 and located between the links 13 which are pivoted by bolt 14 to the supporting rocker arm 7. While not necessary, the lower end of the clutching dog 11 may be provided with a slot 15 which receives the guide 8, thus guiding and bracing the clutching dog 11 against lateral displacement.

The upper end of the clutching dog is provided with notches forming shoulders 16 adapted to bear on the upper and lower faces of the segment. This constitutes the "bite" or grip by which the device is automatically locked to the segment.

Pivoted to the supporting rocker arm 7 is the hand lever 17. The pivotal connection, as shown, is a bolt 18 extending through the links 13 on the opposite side of the supporting rocker arm 7 from the clutching dog 11. The hand lever 17 has an extension 19 adapted to be brought into engagement with the clutching dog 11 when the lever is moved in one direction, thereby tilting the clutching dog on its pivot and releasing its bite or clutching action on the segment. As shown, the extension 19 is slotted and the supporting arm 7 passes therethrough.

For the purpose of preventing the clutch dog 11 gripping the segment 3 when the hand lever is moved in the opposite direction, there is provided a releasing device 20 pivoted at 21 to the lever. As shown, this releasing device has fingers 22 which straddle the parts of the segment and are adapted to be made to engage the clutch dog 11. The lengths of the extension 19 and releasing device 20 are such that the lost motion or play of the hand lever 17 on its pivot is permitted in both directions but one or the other of these releasing means engages the clutching dog.

When the hand lever 17 is pulled or pushed to the left (Fig. 1), to apply the brake, the rocker arm 7 swings on its pivot 6 and the lever 17 swings on pivot 18, whereupon the releasing device engages the upper end of the clutching dog 11, and prevents it from clutching the segment. This is due to the fact that the foregoing movement of the lever 17 bodily moves the dog 11 and the upper end of the latter then rocks to the right, Fig. 1. Immediately the lever is released, the reaction of the brake rod on the supporting rocker arm 7 causes the shoulders 16 to bite the segment with a strong frictional action, thus holding the brake where set.

To release the brake, the hand lever 17 is reversed (moved to the right, in Fig. 1), said lever then swinging on its pivot 18 in the opposite direction until the extension device 19 engages the lower end of the clutch dog 11. When this occurs, the dog 11 is moved on its pivot 12 and its clutching action on the segment is released.

I claim:

1. In an automatically locking brake lever, the combination with a segment, of a pivoted supporting rocker arm, a clutching dog pivotally carried by the supporting rocker arm and adapted to engage the segment, and a hand lever pivoted to, and bodily carried by, the supporting rocker arm, said lever having means adapted to engage the clutching dog on both sides of its pivotal connection to the supporting rocker arm, one or the other of said means preventing said clutching dog from gripping the segment according to the direction of movement of the said hand lever.

2. In an automatically locking brake lever, the combination with a segment, of a pivoted supporting rocker arm, a clutching dog pivoted intermediate its ends to the said supporting rocker arm, said dog being adapted to clutch the segment, a hand lever pivoted intermediate its ends to the supporting rocker arm and having an extension adapted to be brought into engagement with the lower part of the clutching dog when said hand lever is moved in one direction, to thereby release the dog from the segment, and a releasing device pivoted to the hand lever and adapted to travel on the segment, said releasing device being also adapted to engage the upper end of the clutching dog to prevent the clutching dog from gripping the segment when the hand lever is moved in the opposite direction.

3. In an automatically locking brake lever, the combination with a segment, of a pivoted supporting rocker arm provided with an extension constituting a guide, a clutching dog pivoted intermediate its ends to the supporting rocker arm and provided with means at its upper end to engage the segment and having a slot at its lower end, said slot receiving the guide aforesaid, a hand lever pivoted to the supporting rocker arm, said hand lever being provided with an extension adapted to engage the lower slotted end of the clutching dog, and a releasing device carried by the lever adapted to engage the upper end of the clutching dog, the extension of the lever serving to release the clutching dog when said lever is moved in one direction and a releasing device serving to prevent the clutching dog from gripping the segment when the lever is moved in the opposite direction.

4. In an automatically locking brake lever, the combination with a segment, of a pivoted supporting rocker arm provided with an extension constituting a guide, a clutching dog pivoted intermediate its ends to the supporting rocker arm and provided with means at its upper end to engage the segment and having a slot at its lower end, said slot receiving the guide aforesaid, a hand lever pivoted to the supporting rocker arm, the said hand lever being provided with a slotted extension through which the supporting rocker arm loosely passes, said extension being adapted to engage the slotted lower end of the clutching dog when the lever is moved in one direction and to be arrested by the supporting rocker arm when the lever is moved in the opposite direction, and another releasing device carried by the lever adapted to engage the upper end of the clutching dog when the lever is moved in the opposite direction.

5. In an automatically locking brake lever, the combination with a segment, of a pivoted supporting rocker arm, a clutching dog pivotally carried by the supporting rocker arm and adapted to engage the segment, a hand lever pivoted to, and bodily carried by, the supporting rocker arm, said lever having means adapted to engage the clutching dog both sides of its pivotal connection to the supporting rocker arm, one or the other of said means preventing said clutching dog from gripping the segment according to the direction of movement of the said hand lever, one of said means being adapted to engage the supporting rocker arm to arrest the movement of said lever so that it will not swing beyond a predetermined position when releasing the clutching dog.

In testimony whereof I affix my signature.

HENRY LINZY (X) CLEMONS.
his mark

Attest:
HELEN T. McKEEVER.